United States Patent Office

3,448,179
Patented June 3, 1969

3,448,179
PROCESS FOR PREPARING BISPHOSPHITE ESTERS
OF ALKYLIDENE DIPHENOL
Irving Gordon, Niagara Falls, James J. Hodan, Williams-
ville, and James L. Dever, Lewiston, N.Y., assignors
to Hooker Chemical Corporation, Niagara Falls, N.Y.,
a corporation of New York
No Drawing. Filed June 23, 1965, Ser. No. 466,466
Int. Cl. C07f 9/12; C08d 11/04
U.S. Cl. 260—976                             3 Claims

ABSTRACT OF THE DISCLOSURE

Bisphosphite esters of Bisphenol F are made by reacting an aryl hydroxy compound with formaldehyde in the presence of an acid catalyst, to form a dihydroxy compound condensation product, providing a mixture of such condensation product and an aryl hydroxy compound, and reacting phosphorus trihalide with the mixture to produce the desired bisphosphite. The bisphosphites made are useful for stabilizing rubber compositions against the adverse effect of heat.

---

This invention relates to bisphosphite esters of alkylidene diphenols, such as Bisphenol F, and a process for the manufacture thereof.

The use of triphenyl phosphite and alkyl-substituted-aryl phosphites as stabilizers in synthetic rubbers is well known to the art. However, the simple aryl phosphites may undergo hydrolytic decomposition, resulting not only in the production of undesirable phenols but also in lowered concentration of active stabilizer in the polymer. The present invention provides phosphites of increased stability for use as stabilizers for synthetic polymeric materials.

An object of the invention is to provide a novel method for the preparation of bisphosphite esters of alkylidene diphenols, such as bis(4-hydroxyphenyl) methane (Bisphenol F). Another object is to provide novel bisphosphites. Still another object is to provide novel bisphosphites possessing rubber stabilizing properties. Other objects will become apparent to those skilled in the art from the following detailed description.

In order that the invention may be more easily understood, the compounds of the invention may be represented by the following formula:

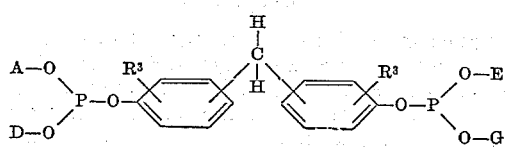

wherein A, D, E and G are radicals independently characterized by the structure

where $R^1$ and $R^2$ are independently selected from the group consisting of hydrogen, alkyl having from 1 to 18 carbon atoms, preferably from 1 to 12 carbon atoms; aryl having from 6 to 12 carbon atoms, preferably from 6 to 9 carbon atoms; aralkyl having from 7 to 12 carbon atoms, and preferably from 7 to 9 carbon atoms, α-alkyl-benzyl, being a preferred aralkyl radical, where alkyl denotes a radical having from 1 to 6 carbon atoms, and preferably from 1 to 3 carbon atoms; and halogen, of which chlorine and bromine are preferred; and $R^3$ is selected from the group consisting of hydrogen, alkyl having from 1 to 12 carbon atoms, preferably from 1 to 9 carbon atoms, and most preferably from 1 to 3 carbon atoms; and halogen, of which chlorine and bromine are preferred.

In accordance with the invention, the invented compounds may be prepared by a process which comprises reacting an arylhydroxy compound of the formula

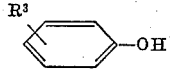

where $R^3$ is as previously described, and an aldehyde, in the presence of an effective amount of an acid catalyst, whereby a dihydroxy compound and water of condensation are formed, removing the water and acid catalyst, as well as any undesired excess arylhydroxy compound which may be present, providing an arylhydroxy compound of the formula

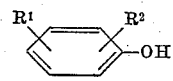

where $R^1$ and $R^2$ are as previously described, with the residual dihydroxy compound, heating the reaction mixture, reacting therewith a phosphorus trihalide, and isolating or recovering the desired bisphosphite reaction product, for example, as a pot residue.

The condensation reaction employed for the in situ preparation of the dicyclic dihydroxy compound may be illustrated by the following equation:

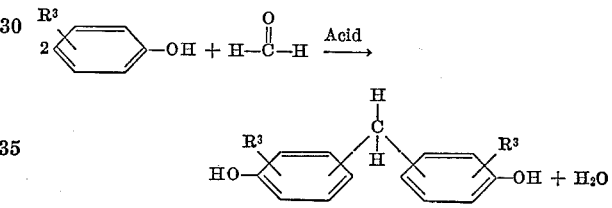

where $R^3$ is as previously described.

If desired, the process of the invention may be carried out in the presence of an inert organic solvent, such as a hydrocarbon solvent, although the use of solvent is not ordinarily required. As indicated, the solvent should be inert so as not to participate in the reaction of phosphorus trihalide, arylhydroxy compound and dihydroxy compound.

Illustrative of the bisphosphites which may be prepared according to the novel method of this invention are the following: tetraphenyl bisphenol F bisphosphite, tetra (nonylphenyl) bisphenol F bisphosphite, tetra (t-butylphenyl) bisphenol F bisphosphite, tetra (α-methylbenzylphenyl) bisphenol F bisphosphite, tetra (4-chloro-α-methylbenzylphenyl) bisphenol F bisphosphite, tetra (4-methyl-α-methylbenzylphenyl) bisphenol F bisphosphite, and the like.

Typical examples of the arylhydroxy compounds employed in the condensation reaction include the following: phenol, o-cresol, m-cresol, p-cresol, p-t-butyl phenol, p-hexyl phenol, p-octyl phenol, p-nonyl phenol, p-decyl phenol, m-octyl phenol, m-nonyl phenol, o-nonylphenol, o(α-methyl - benzyl)phenol, m(α - methylbenzyl)phenol, p(α-methylbenzyl)phenol, o - chloro - phenol, m - chlorophenol, p-chlorophenol, and the like.

Arylhydroxy compounds employed in the phosphorus trihalide reaction include those mentioned above, and additionally include compounds, such as 2,6-xylenol, 2,4-xylenol, 2,5-xylenol, 2,4-di(t-butyl)phenol, 2,4-di(α-methylbenzyl)phenol, 2,4 - di(t-aryl)phenol, 2,4 - dichlorophenol, and the like.

The preferred phosphorus trihalides are phosphorus trichloride and phosphorus tribromide. Of these, phosphorus trichloride is most preferred.

In conducting the condensation reaction, from about 2 to 6 or more molar proportions of arylhydroxy compound for the condensation reaction, based on the weight of aldehyde employed, may be charged initially to a reaction vessel with an effective catalytic amount of an acidic compound, such as hydrochloric acid, sulfuric acid, and the like. Usually, the catalytic amount utilized is from about 0.5 percent to 10 percent by weight based on weight of aldehyde employed, preferably from about 0.5 percent to 5 percent on the basis mentioned above. In practice, 6 or more molar proportions of arylhydroxy compound for the condensation reaction are employed. Following this initial charge, heat is applied and a 1 molar proportion of formaldehyde is added. The temperature for the reaction is maintained in the range of from about 80 degrees centigrade to 120 degrees centigrade, and preferably from about 95 degrees centigrade to 105 degrees centigrade. The principal product of the foregoing reaction is a 4,4' methylenediarylhydroxy compound, although minor amounts of the 2,2' and 2,4' hydroxy substituted isomers may be produced. When said isomers are present, they may be separated from the principal product by conventional techniques, which include distillation and the like. However, in the practice of the invention separation is not required.

Upon completion of the condensation reaction, which generally may take from about 0.30 hour to 3 hours, the acidic catalyst and formed water of condensation are removed from the residual mixture by heating and maintaining the mixture at a temperature below the boiling point of the dihydroxy reaction product and arylhydroxy compound; for example, a temperature in the range of 90 degrees centigrade to 120 degrees centigrade is generally effective. This procedure is usually conducted at sub-atmospheric pressures which may be in the range of from about 1 millimeter of mercury absolute pressure to less than 1 atmosphere; however, it is also within the scope of the invention to employ atmospheric pressure. The excess arylhydroxy compound present in the residual mixture may or may not be removed from said residue, depending upon the nature of substitution desired in the bisphosphite end product. Generally, means for removal of the excess arylhydroxy compound include distillation and the like. This removal is preferably conducted at a temperature below the boiling point of the dihydroxy compound but above the boiling point of the arylhydroxy compound.

In cases where the arylhydroxy compound is removed from the residue mixture, thus leaving the dihydroxy compound, quantities of up to 10 molar proportions of arylhydroxy compound for the phosphorus halide reaction are added to the remaining residue product. Generally, however, substantially about 4 molar proportions are employed. To this mixture or to the unseparated condensation reaction mixture, as the case may be, are added substantially 2 molor proportions of phosphorus trihalide based on the weight of formaldehyde, as the temperature of the reaction mixture is raised to and maintained in the range of about 130 degrees centigrade to about 170 degrees centigrade, preferably between 145 degrees centigrade and 160 degrees centigrade. It is within the scope of the invention to employ mixtures of arylhydroxy compounds in the above-described procedure.

When the reaction is completed, the desired product may be recovered in the reaction vessel. This is generally accomplished by the removal of any excess arylhydroxy compound from the reaction mixture, employing conventional techniques, such as distillation and the like. Due to the high yields obtainable in many cases, as when no more than a total of 6 molar proportions of arylhydroxy compounds and 2 molar proportions of phosphorus trihalide are employed, separation of the arylhydroxy compound from the bisphosphite reaction product is not always required for utility of the product and in such cases may be omitted.

The compounds which are provided in accordance with invention find particular utility as stabilizers for rubber compositions such as conjugated diene rubbers, which include 1,3-butadiene-styrene (GR–S), 1,3-butadiene-acrylonitrile, 1,3-butadiene-methyl methacrylate, polybutadiene, polyisoprene and the like. They are incorporated with the rubber composition in small but effective stabilizing proportions or amounts such as from about 0.25 to 5 or more parts by weight based on 100 parts by weight of rubber composition.

The following examples are given to illustrate the novel process of this invention. It is to be understood that the examples are not to be construed as limiting the invention, except as defined in the appended claims. All temperatures are in degrees centigrade and all parts are by weight, unless otherwise mentioned.

EXAMPLE 1

Preparation of tetraphenyl bisphenol-F bisphosphite

A reaction vessel was charged with 124.2 parts of phenol and 0.3 part of concentrated hydrochloric acid. This mixture was heated to 100 degrees centigrade and 16.2 parts of 37 percent aqueous formaldehyde were added in 0.3 hour at 100–110 degrees centigrade. The mixture was heated and refluxed for 1 hour, followed by the stripping of water and hydrochloric acid therefrom at 120 degrees centigrade and 100 millimeters of mercury absolute pressure. Vacuum which had been applied was removed. The residue was heated to 150 degrees centigrade and 54.9 parts of phosphorus trichloride was added below the surface of the reaction mixture, while the temperature was maintained above 150 degrees centigrade. Upon completion of the addition, the mixture was heated at 155–165 degrees centigrade for 1 hour, cooled and concentrated by heating to 162 degrees centigrade at 5 millimeters of mercury absolute pressure to remove the excess phenol (96 percent of the excess recovered). The reaction produced 123 parts of a yellow residue (97 percent of theory). The product was found to contain 0.08 percent of chlorine and 9.5 percent of phosphorus. The calculated percentages for these elements in

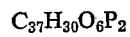

are chlorine 0.0 percent, phosphorus 9.8 percent.

EXAMPLE 2

Preparation of tetra(nonylphenyl) bisphenol-F bisphosphite

A reaction vessel was charged with 94.1 parts of phenol and 0.5 part of concentrated hydrochloric acid. This mixture was warmed to 100 degrees centigrade and 20.3 parts of 37 percent aqueous formaldehyde were added in 0.4 hour at 100–105 degrees centigrade. After stirring for 1 hour at 105 degrees centigrade, the mixture was cooled and then stripped of hydrochloric acid and water by heating to 128 degrees centigrade at 100 millimeters of mercury absolute pressure. The excess phenol was stripped by heating to 160 degrees centigrade at 5 millimeters of mercury absolute pressure. To the remaining residue were added 222.4 parts of nonyl phenol. The temperature of the resulting mixture was maintained at 150–155 degrees centigrade, and 68.7 parts of phosphorus trichloride were added below the reaction surface over a period of 1.2 hours. The mixture was heated for one hour at 160 degrees centigrade, and thereafter was concentrated by heating to 165 degrees at 5 millimeters of mercury absolute pressure to yield 284.2 parts of pale, yellow residue (100 percent conversion resulted). The product was found to contain 0.04 percent chlorine and 5.2 percent of phosphorus. The calculated percentages for these elements in $C_{73}H_{102}O_6P_2$ are 0.0 percent chlorine and 5.5 percent phosphorus.

EXAMPLE 3

Preparation of tetra(p-butylphenyl) bisphenol-F bisphosphite

A reaction vessel was charged with 112.9 parts of phenol and 0.5 part of hydrochloric acid. This mixture was heated to 110 degrees centigrade and 24.4 parts of 37 percent aqueous formaldehyde were added dropwise over a period of 0.3 hour at 100–105 degrees centigrade. After heating at 105 degrees centigrade for 1 hour, the hydrochloric acid and water were removed by concentration, which was accomplished by heating to 125 degrees centigrade at 100 millimeters of mercury absolute pressure. After changing the receiver, the excess phenol was removed by heating to 155 degrees centigrade at 5 millimeters of mercury absolute pressure. The phenol recovered was 100 percent of the theoretical amount. Thereafter, the reaction mixture was cooled to 90 degrees centigrade and 180.3 parts of t-butylphenol were added to the reaction mixture. The resulting mixture was heated to 150 degrees centigrade and 82.4 parts of phosphorus trichloride were added below the reatcion surface over a period of 1 hour at 145–155 degrees centigrade. The mixture was heated at 160 degrees centigrade for one hour, cooled and concentrated by heating to 162 degrees centigrade at 5.1 millimeters of mercury absolute pressure to yield 245.2 parts of a very viscous residue. The product was found to contain 0.04 percent of chloride and 7.0 percent of phosphorus. The calculated percentages for these elements in $C_{63}H_{62}O_6P_2$ are 0.0 percent chlorine and 7.2 percent phosphorus.

EXAMPLE 4

Preparation of tetra(α-methylbenzylphenyl) bisphenol-F bisphosphite

A reaction vessel was charged with 94.1 parts of phenol and 0.5 part of concentrated hydrochloric acid. This mixture was heated to 100 degrees centigrade and 20.4 parts of 37 percent aqueous formaldehyde were added in 0.25 hour at 100 degrees centigrade. The resulting mixture was refluxed for 1 hour and the formed water and hydrochloric acid were removed by heating to 120 degrees centigrade at 100 millimeters of mercury absolute pressure. The receiver was changed and the excess phenol was removed by heating to 155 degrees centigrade at 5 millimeters of mercury absolute pressure. The recovery of phenol was 100 percent of the theoretical. After cooling to 90 degrees centigrade 199 parts of α-methylbenzyl phenol were added. The resulting mixture was heated to 150 degrees centigrade and 68.7 parts of phosphorus trichloride were added below the reaction surface in 1 hour at 150–155 degrees centigrade. After heating for 1 hour at 155 degrees centigrade, -the residue was concentrated by heating to 160 degrees centigrade at 5 millimeters of mercury absolute pressure to yield 255.4 parts of product. The product was found to contain 0.02 percent of chlorine and 5.3 percent of phosphorus. The calculated percentages of these elements in $C_{69}H_{62}O_6P_2$ are 0.0 percent chlorine and 5.9 percent of phosphorus.

EXAMPLE 5

Preparation of tetra(4-chloro-α-methylbenzylphenyl) bisphenol-F bisphosphite

A reaction flask was charged with 75.3 parts of phenol and 0.75 part of concentrated hydrochloric acid. This mixture was heated to 100 degrees centigrade and 16.2 parts of 37 percent aqueous formaldehyde were added over a period of 0.15 hour at 100–105 degrees centigrade. After heating for 1 hour at 100 degrees centigrade, the mixture was freed of water and HCl by heating to 120 degrees centigrade at 100 millimeters of mercury absolute pressure. The excess phenol was removed by heating to 150 degrees centigrade at 4.5 millimeters of mercury absolute pressure. After cooling the residue to 90 degrees centigrade, 186.2 parts of 4-chloro-α-methylbenzyl phenol were added. The mixture was heated to 145 degrees centigrade and 0.7 part of phosphorus trichloride was added below the reaction surface in 0.5 hour. After heating for 1 hour at 150 degrees centigrade, the mixture was concentrated by heating to 160 degrees centigrade at 4.5 millimeters of mercury absolute pressure to yield 233 parts (98 percent conversion) of residue product. The product was found to contain 12.3 percent of chlorine and 4.47 percent of phosphorus. The calculated percentages of these elements in $C_{69}H_{58}Cl_4O_6P_2$ are 11.9 percent of chlorine and 5.23 percent of phosphorus.

EXAMPLE 6

Preparation of tetra(4-methyl-α-methylbenzylphenyl) bisphenol-F bisphosphite

A reaction vessel was charged with 94.1 parts of phenol and 0.75 part of concentrated hydrochloric acid. This mixture was heated to 100 degrees centigrade and 20.3 parts of 37 percent aqueous formaldehyde were added in 0.2 hour at 100–105 degrees centigrade. After heating at reflux for 1 hour the formed water and hydrochloric acid were removed by heating to 120 degrees centigrade at 100 millimeters of mercury absolute pressure. The excess phenol was removed by heating to 180 degress centigrade at 0.5 millimeter of mercury absolute pressure. The mixture was cooled to 80 degrees centigrade and 212.3 parts of 4-methyl-α-methylbenzyl phenol were added. Thereafter, the mixture was heated to 150 degrees centigrade and 68.7 parts of phosphorus trichloride were added below the surface in 0.5 hour. After heating at 155 degrees centigrade for 1 hour, the mixture was stripped by heating to 164 degrees centigrade at 5.0 millimeters of mercury absolute pressure to yield 268 parts (97 percent conversion) of residual product. The product was found to contain 0.05 percent of chlorine and 5.1 percent of phosphorus. The calculated percentages of these elements in $C_{73}H_{70}O_6P_2$ are 0.0 percent chlorine and 5.6 percent of phosphorus.

EXAMPLE 7

GR–S rubber crumb was prepared by diluting 2,955 parts of General Tire unstabilized 1502 rubber latex (mixed rosin and fatty acid, cold butadiene-styrene latex, wherein the rubber hydrocarbon contains 23.5 percent bound styrene) containing approximately 20 percent rubber hydrocarbon, with 3,000 parts of water, and thereafter adding a solution comprising 75 parts sodium chloride dissolved in 700 parts of water to cream latex. The mixture was heated to and maintained at 45 degrees centigrade, and 3,031 parts of 2 percent sulfuric acid were added in divided portions with stirring. The formed rubber crumb was digested for 15 minutes at 49 degrees centigrade, cooled to room temperature and washed with water until free of chlorine ion, as detected by the silver nitrate test. The rubber crumb was dried to a constant weight, employing an air circulating oven maintained at 65 degrees centigrade.

EXAMPLE 8

This example illustrates the stabilizing properties of the bisphosphites of the invention in synthetic rubber mixtures.

Several different test samples, as shown hereinafter at Table I, were prepared, employing mixtures of 75 parts of dried butadiene-stryrene crumb of Example 7 and 1.2 parts of a bisphosphite stabilizer of this invention. Each mixture was milled with blending on an unheated 2-roll mill until uniform quarter inch thick sheets were obtained. Each sheet was cut into strips which were placed in a circulating oven maintained at 130 degrees centigrade. At various intervals, samples of each mixture were withdrawn and checked for resinification and phenolic odor. A control containing no bisphosphite was also prepared and tested.

Resinification is defined as the surface cracking of a stretched polymer film previously exposed to heat whereby a melted surface film was produced.

TABLE I

| Sample | Stabilizer | Resinification after exposure to 130 degrees centigrade for— | | | |
|---|---|---|---|---|---|
| | | 1 hour | 3 hours | 6 hours | 8 hours |
| 1 | None | Slight | Severe | | |
| 2 | Tetra(nonylphenyl) bisphenol-F bisphosphite. | None | None | Severe | |
| 3 | Tetra(α-methylbenzylphenyl)bisphenol-F bisphosphite. | None | None | Medium | Severe. |
| 4 | Tetraphenyl bisphenol-F bisphosphite. | None | None | None | None. |

Additionally, no phenolic odor could be detected in samples 2, 3 and 4.

What is claimed is:

1. A process for preparing a bisphosphite of the formula

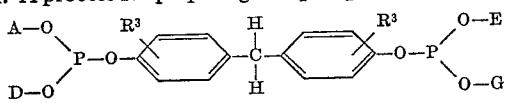

wherein A, D, E and G are of the structure

wherein $R^1$ and $R^2$ are selected from the group consisting of hydrogen, alkyl of 1 to 18 carbon atoms, aryl of 6 to 12 carbon atoms, arylalkyl of 7 to 12 carbon atoms, chlorine and bromine, which comprises reacting from 2 to about 6 molar proportions of an arylhydroxy compound of the formula

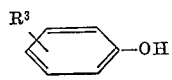

wherein $R^3$ is selected from the group consisting of hydrogen, alkyl of 1 to 18 carbon atoms, chlorine and bromine, with 1 molar proportion of formaldehyde, in the presence of a catalytic amount, about 0.5 to 10% of the aldehyde weight, of an acidic catalyst selected from the group consisting of sulfuric acid and hydrochloric acid, at a temperature in the range of about 80 degrees centigrade to 120 degrees centigrade, to produce a dihydroxy condensation product and water, removing acid catalyst and water, providing from about 4 to 10 molar proportions of an arylhydroxy compound of the formula

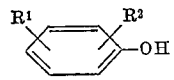

wherein $R^1$ and $R^2$ are as previously described, to form a mixture with the dihydroxy condensation product, reacting about two molar proportions of phosphorus trihalide with the resulting mixture at a temperature in the range of about 130 degrees centigrade to about 170 degrees centigrade, and recovering the bisphosphite produced.

2. A process according to claim 1 wherein the excess of arylhydroxy compound after reaction with the formaldehyde is retained in the reaction mixture and is subsequently reacted with phophorus trihalide and dihydroxy condensation product, to produce a bisphosphite.

3. A process according to claim 1 wherein, after reaction of arylhydroxy compound and formaldehyde, excess arylhydroxy compound is removed from the reaction mixture, by distillation.

References Cited

UNITED STATES PATENTS

| 1,448,556 | 3/1923 | McIntosh | 260—619 |
| 2,643,265 | 6/1953 | Toy | 260—930 |
| 3,254,050 | 5/1966 | Baranauckas et al. | 260—930 |

CHARLES B. PARKER, Primary Examiner.

A. H. SUTTO, Assistant Examiner.

U.S. Cl. X.R.

260—457, 619, 808, 930